No. 758,117. PATENTED APR. 26, 1904.
H. C. SNOOK.
STEREOSCOPIC APPARATUS.
APPLICATION FILED JUNE 22, 1903.
NO MODEL. 2 SHEETS—SHEET 1.
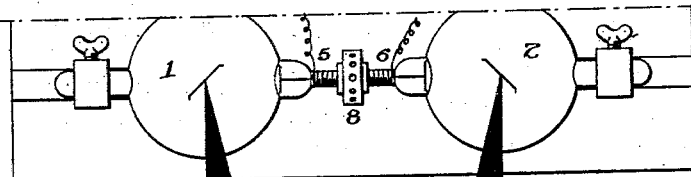
*Fig. 1.*
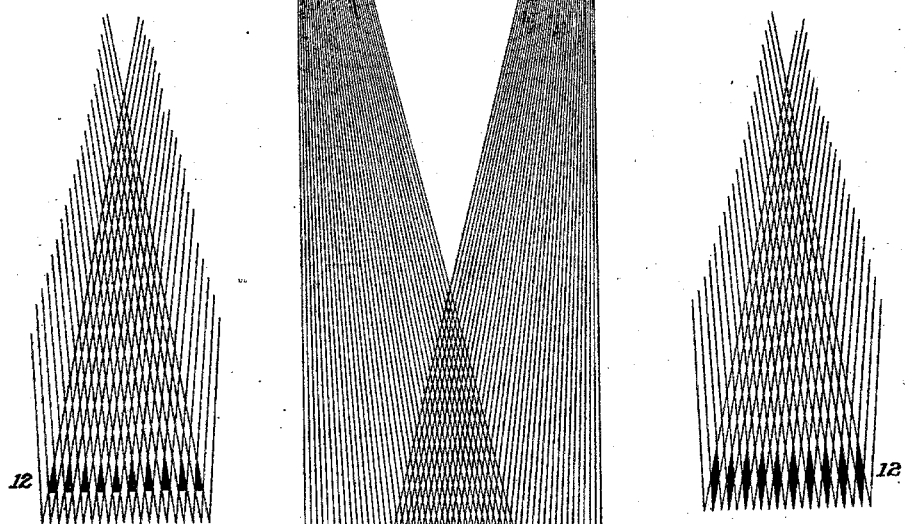
*Fig. 3.*  *Fig. 4.*
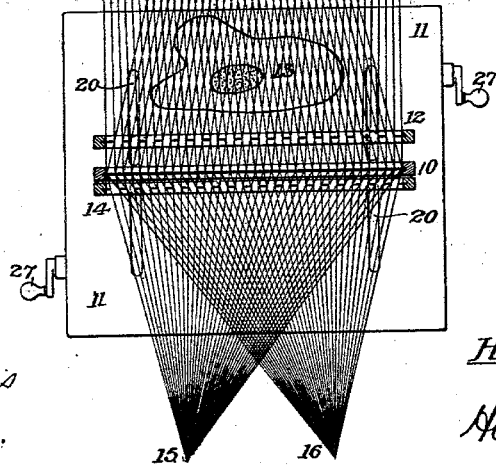
Witnesses:
Inventor:
Homer Clyde Snook
by his Attorneys
Howson & Howson

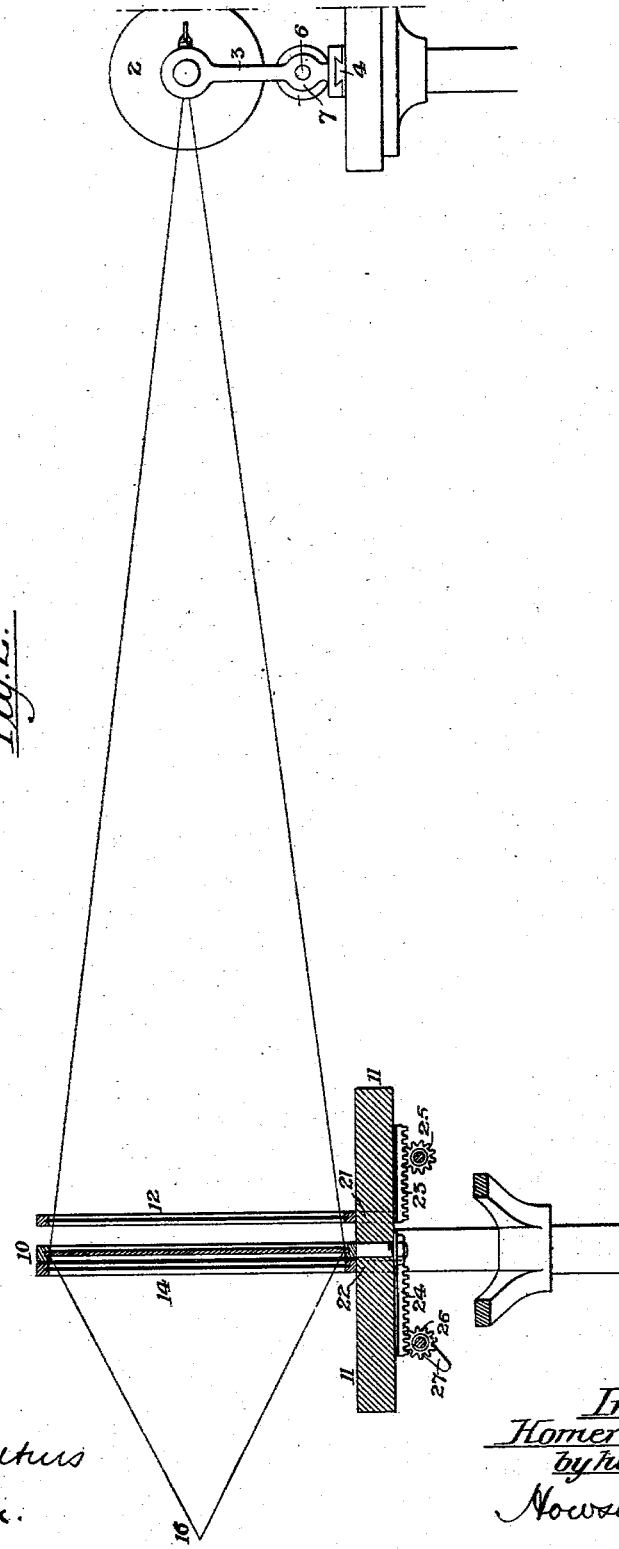

No. 758,117.

Patented April 26, 1904.

UNITED STATES PATENT OFFICE.

HOMER CLYDE SNOOK, OF PHILADELPHIA, PENNSYLVANIA.

STEREOSCOPIC APPARATUS.

SPECIFICATION forming part of Letters Patent No. 758,117, dated April 26, 1904.

Application filed June 22, 1903. Serial No. 162,594. (No model.)

*To all whom it may concern:*

Be it known that I, HOMER CLYDE SNOOK, a citizen of the United States, residing in Philadelphia, Pennsylvania, have invented certain Improvements in Stereoscopic Apparatus, of which the following is a specification.

My invention relates to the use of Roentgen rays in the production of stereoscopic images; and it consists of an apparatus for carrying out a modification of the method of cutting off from one image the rays that produce the opposite image described and claimed in a former application, filed December 4, 1902, Serial No. 133,838.

In the apparatus forming the subject of my present invention I employ a set or series of non-permeable stops so arranged between a fluorescent screen and the sources of radiation that two sets of images are formed, which are viewed by a similar set or series of non-permeable stops, whereby each eye sees a set of images formed by a single source of radiation, such images blending into a single continuous image and producing the desired stereoscopic effect.

My invention is fully shown in the accompanying drawings, in which—

Figure 1 is a diagrammatic plan view of one form of apparatus embodying my invention. Fig. 2 is a side elevation of the same, and Figs. 3 and 4 are views illustrating details of my invention.

Referring to the drawings, 1 and 2 represent a pair of Roentgen or X ray tubes suitably mounted upon a stand so as to be movable from and toward each other, the stand being also freely movable. For the purpose of moving the tubes I may mount the tubes upon suitable standards 3, arranged to slide in a track 4, and employ right and left handed screws 5 and 6, adapted to nuts 7, carried by the standards, such screws having a common operating member 8. The fluorescent screen is shown at 10, and this screen is preferably carried by a portable stand or table 11, so as to be readily movable from and toward the source of radiation. Between this screen and the source of radiation there is mounted a set of stops, (indicated at 12 and arranged gridlike adjacent to the fluorescent screen,) and between this set of stops and the source of radiation the object to be viewed (indicated at 13) is placed. These stops are so arranged that the shadows formed by one source of radiation—that illustrated at 1, for instance—exactly cover the spaces illuminated by the other source of radiation or that illustrated at 2, and vice versa. There are thus formed two sets of images which are stereoscopic with respect to each other because of the angle between the two beams of radiation passing through the object and falling upon the fluorescent screen. These two images are necessarily viewed by means of a set of stops 14, disposed between the fluorescent screen and the eyes and so arranged that each eye (represented by the points 15 and 16) sees but one set of images from the sources of radiation, the left eye, for instance, seeing the images produced by the right-hand tube or source of radiation, and vice versa. Pseudo-stereoscopic effect is obtained by shifting the position of the eyes along the base-line parallel to the fluorescent screen. This action in connection with the true stereoscopic effect has the apparent result of causing the object to advance and recede from the eyes of the observer. This condition or effect in using the apparatus is particularly applicable for locating the position of foreign bodies in the human anatomy.

The stops 12 and 14 should be very numerous—say eighty to the inch—so that to the eyes of the observer the separate images formed by the separate sources of radiation blend into a single continuous image having true stereoscopic value. These stops may be made of wire of any suitable substance capable of resisting Roentgen radiation.

In Figs. 3 and 4 I have shown forms of stops very greatly exaggerated, those in Fig. 3 being triangular in shape, while those of Fig. 4 are diamond-shaped. Any form of desirable cross-section may be used, and in the form of screen shown in Fig. 1 the stops are represented by opaque lines drawn, etched, or otherwise formed on a plain sheet of glass. These stops are mounted in suitable frames, and these frames are arranged to be movable from and toward the fluorescent screen. For this purpose the table or stand 11 on which the fluorescent screen is mounted is slotted at 20 for the passage of stems 21 and 22, supporting these screens, which stems carry rack-sections 23 and 24, and engaging these rack-sections are pinions 25 and 26, movable by means of handles 27 or other suitable means.

Objects viewed by this apparatus have the peculiar effect of appearing like a picket fence, which may be seen together with all that is behind the fence.

As illustrated and described in my former application, two sources of radiation may be arranged within the same tube. This arrangement, however, in view of the fixed relation of the anticathodes, restricts the perspective and makes the stereoscopic angle small, the apparent depth of the image not being normal. If two tubes are used, they must be of the same vacuum to produce images of the same brilliancy, as otherwise the attention of the observer will be fixed upon the more brilliant image and the stereo effect will be lost.

Having thus described my invention, I claim and desire to secure by Letters Patent—

1. The combination in an X-ray stereoscopic apparatus, of two sources of radiation, a fluorescent screen, and a series of stops interposed between said screen and the source of radiation.

2. The combination in an X-ray stereoscopic apparatus, of two sources of radiation adjustable from and toward each other, a fluorescent screen, and a series of stops interposed between said screen and the source of radiation.

3. The combination in an X-ray stereoscopic apparatus, of two sources of radiation, a fluorescent screen and a screen of alternate transparent portions and portions impenetrable to the X-ray interposed between the source of radiation and the fluorescent screen and so adjusted as to give a stereoscopic effect by the parallax of binocular vision.

4. The combination in an X-ray stereoscopic apparatus, of two sources of radiation, a fluorescent screen and a series of stops interposed between such screen and the source of radiation, such stops being so arranged as to cut off from each image the rays which produce the opposite image.

5. The combination in an X-ray stereoscopic apparatus, of two sources of radiation, a fluorescent screen, and a screen formed of a series of wires of a substance impenetrable to the X-ray disposed so as to provide spaces of equal width between the same, such screen being interposed between the fluorescent screen and the source of radiation.

6. The combination in an X-ray stereoscopic apparatus, of two sources of radiation, a fluorescent screen, a series of stops disposed between said screen and the source of radiation, said stops serving to divide the images into a series of parallel lines, and means for viewing such images as they are displayed upon the fluorescent screen.

7. The combination in an X-ray stereoscopic apparatus, of two sources of radiation mounted so as to be movable toward and from each other, a portable stand or table for said sources of radiation, a fluorescent screen, a portable stand or table for the same, an adjustable screen comprising a series of stops carried by said table and interposed between the source of radiation and the fluorescent screen, and an adjustable viewing-screen comprising a series of stops also carried by said latter table.

8. The combination in an X-ray stereoscopic apparatus, of two sources of radiation comprising X-ray tubes, a mounting for said tubes whereby they may be moved toward and from each other simultaneously, a fluorescent screen, a series of stops interposed between said screen and the source of radiation, and a series of stops disposed between said screen and the point of vision so adjusted as to give a stereoscopic effect by the parallax of binocular vision.

9. The combination in an X-ray stereoscopic apparatus, of two X-ray tubes mounted so as to be adjustable from and toward each other, a fluorescent screen, a series of stops interposed between said screen and the source of radiation, means for adjusting said stops between these points, and an adjustable mounting for the fluorescent screen.

10. The combination in an X-ray stereoscopic apparatus, of two sources of radiation adjustable from and toward each other, a fluorescent screen adjustable from and toward the source of radiation, a series of stops interposed between the source of radiation and said screen and adjustable between the same, and a series of viewing-stops disposed beyond the screen and between the latter and the point of vision, said viewing-stops being adjustable from and toward the screen relatively to the adjustment of the stops interposed between the screen and the source of radiation, and serving to give a stereoscopic effect by the parallax of binocular vision.

In testimony whereof I have signed my name to this specification in the presence of two subscribing witnesses.

HOMER CLYDE SNOOK.

Witnesses:
 MURRAY C. BOYER,
 JOS. H. KLEIN.